United States Patent [19]
Hill

[11] Patent Number: 4,718,698
[45] Date of Patent: Jan. 12, 1988

[54] APPARATUS AND METHOD OF FORMING FUSION WELDED BUTT JOINT BETWEEN THERMOPLASTIC PIPE SECTIONS

[75] Inventor: Donald C. Hill, Pasadena, Calif.

[73] Assignee: R. W. Lyall & Company, Inc., Santa Fe Springs, Calif.

[21] Appl. No.: 796,545

[22] Filed: Nov. 8, 1985

[51] Int. Cl.$^4$ ............................................. F16L 47/02
[52] U.S. Cl. ........................................ 285/21; 285/31; 285/398; 156/294; 219/544
[58] Field of Search .................... 285/31, 22, 398, 371, 285/915, 21; 156/294; 219/544

[56] References Cited

U.S. PATENT DOCUMENTS

| | | | |
|---|---|---|---|
| 1,912,993 | 6/1933 | Murray . | |
| 2,739,829 | 3/1956 | Pedlow et al. | 285/115 |
| 2,963,394 | 12/1960 | Wilkinson | 154/116 |
| 3,080,060 | 3/1963 | Blumenkranz et al. | 210/169 |
| 3,094,452 | 6/1963 | Von Riegen et al. | 156/275 |
| 3,235,289 | 2/1966 | Jones | 285/21 |
| 3,378,672 | 4/1968 | Blumenkranz | 219/200 |
| 3,422,179 | 1/1969 | Bauer et al. | 264/272 |
| 3,506,519 | 4/1970 | Blumenkranz | 156/275 |
| 3,788,928 | 1/1974 | Wise | 156/294 |
| 3,826,521 | 7/1974 | Wilhelmsen | 285/31 X |
| 3,850,459 | 11/1974 | Blumenkranz et al. | 285/156 |
| 3,865,410 | 2/1975 | Chen | 285/31 |
| 3,920,787 | 11/1975 | McDowell et al. | 264/263 |
| 3,936,081 | 2/1976 | Blumenkranz | 285/231 |
| 3,956,817 | 5/1976 | Blumenkranz | 29/446 |
| 3,961,814 | 6/1976 | Byrne et al. | 285/21 |
| 3,969,170 | 7/1976 | Landgraf | 156/158 |
| 3,975,039 | 8/1976 | Penneck et al. | 285/371 X |
| 4,092,193 | 5/1978 | Brooks | 156/83 |
| 4,176,274 | 11/1979 | Lippera | 219/522 |
| 4,257,630 | 3/1981 | Bartell et al. | 285/371 X |
| 4,313,053 | 1/1982 | Sturm | 219/544 |
| 4,436,987 | 3/1984 | Thalmann et al. | 219/535 |
| 4,436,988 | 3/1984 | Blumenkranz | 219/544 |
| 4,493,985 | 1/1985 | Keller | 219/535 |
| 4,508,368 | 4/1985 | Blumenkranz | 285/21 |
| 4,521,037 | 6/1985 | Knox | 285/31 X |
| 4,530,520 | 7/1985 | Nyffeler et al. | 285/21 |
| 4,530,521 | 7/1985 | Nyffeler et al. | 285/21 |

FOREIGN PATENT DOCUMENTS 1434490  5/1976  United Kingdom ............... 285/398

Primary Examiner—Thomas F. Callaghan
Attorney, Agent, or Firm—Fulwider, Patton, Rieber, Lee & Utecht

[57] ABSTRACT

An apparatus and method for forming a fusion welded butt joint between thermoplastic pipe sections. Thermoplastic tubular insert sleeves having end flanges are inserted into the ends of the pipe sections with the flanges located in abutting relation. A coupling collar mounting a heating device is slid along one of the pipe sections into overlying relation with the butt joint formed by the engaged flanges. The heating device is energized to fusion weld the coupling sleeve to the pipe sections and to the flanges. The insert sleeves internally support the butt joint area of the pipe sections against thermal sagging during the fusion welding, and the flanges in their molten state tend to flow and compensate for dimensional discrepancies in the pipe sections.

5 Claims, 5 Drawing Figures

APPARATUS AND METHOD OF FORMING FUSION WELDED BUTT JOINT BETWEEN THERMOPLASTIC PIPE SECTIONS

BACKGROUND OF THE INVENTION

1. Field of the Invention

The present invention relates to an apparatus and method of forming a fusion welded butt joint between thermosplastic pipe sections.

2. Description of the Prior Art

Pipelines made of medium to high density polyethylene or similar thermoplastic material are commonly used for transporting natural gas or the like. While, upon original installation a joint may be made by applying heat direct to the ends of pipe sections to fuse them directly together to form a butt joint, in certain applications, as for instance in repairing pipe previously buried underground, the pipe is so restricted against movement that a direct butt joint cannot be made. This is because, when a section of replacement pipe is installed in close fitting relationship within a gap formed between the ends of the pipe left when a damaged section of pipe has been removed, there is insufficient space between the confronting pipe ends to receive a heating rod for melting the pipe to its molten, or fusing, temperature thereby achieving direct fusion. In these instances there have been efforts to joint the pipe sections together by a thermoplastic coupling collar which receives the pipe sections within its opposite ends. The collar incorporates a helical heating coil formed by continuous wraps of coil spaced longitudinally along the inner surface thereof. Energization of the coil raises the temperature of the interface between the coupling and the abutting pipe sections to its molten level to cause fusion. This type of fusion welded joint is characterized by a number of significant shortcomings.

More particularly, when the interface between the coupling collar and the pipe sections is heated to a molten state, the wraps or lops of the heating coil tend to float in the molten material frequently resulting in some becoming disposed in more closely spaced relationship than others. In the areas of the more closely spaced wraps there will be a concentration of heat while in the area of the wraps of greater spacing there will be an absence of heat resulting in an uneven temperature profile along the length of the heating coil. Oftentimes the location of the elevated temperature will be at the butt joint interface resulting in the pipe wall becoming more molten than the remainder of the length of collar. This results in the thermoplastic material forming the wall of the pipe adjacent the butt joint losing its structural rigidity causing it to deform or flow. As a consequence, the end portions of the pipe wall adjacent the butt joint will sag radially inwardly, and the tendency of the wraps, or loops, of the helical heating element to migrate toward the sagging area will be enhanced. The resulting concentration of heat at the butt joint compounds the sagging problem, accelerating the flow of molten material and the migration of the heating coil loops toward the butt joint area, all before the interface throughout the remainder of the collar has reached its fusion temperature. Since the heating coil must remain heated until fusion has been achieved between the collar and pipe sections for some distance from the pipe ends, the temperature in the sagging areas will continue to elevate creating "hot spots" where the thermoplastic pipe walls will become burned thus leading to deterioration of the structure of the plastic itself. These shortcomings are compounded by the fact that the pipe ends are frequently of an irregular cut thus leaving gaps of as much as ⅛ inch one one side or the other when the ends are abutted together for fusion. The amount of parent material required from the wall of the pipe to fill such gaps during fusion is limited thus frequently leading to the wall of the joint in that area being relatively thin thereby resulting in the section being heated to an even higher temperature during fusion. The fusion welded joint which develops under this method is imperfectly formed and susceptible to structural failure and gas leakage.

Attempts have been made in the prior art to solve the development of such "hot spot" heating adjacent the butt joint by employing two separate helical coils spaced apart on opposite sides of the butt joint to thus avoid applying heat directly to the interface of the pipe ends. This is a relatively expensive expedient which is not completely effective and leaves the unheated portion at the interface of the pipe ends unfushed and susceptible to subsequent entry of fluids under pressure between the pipe wall and sleeve, a condition which in use may create stress risers thus further deteriorating the joint.

Another prior art attempt to preserve the structural integrity of thermally fused pipe section end portions is disclosed in U.S. Pat. No. 3,788,928, issued Jan. 29, 1974 for a "Method of Forming a Lap Joint Between Tubular Articles of Thermoplastic Material". As its title indicates, the patented method is directed to a lap joint. It utilizes a reinforcing sleeve of a material having a melting temperature higher than that of the thermoplastic pipe. The sleeve is inserted into one pipe section end portion to support the joint area such that when the pipe is heated only to its fusion temperature, the insert will not melt and will afford support against radially inward sagging during the fusion welding step. However, since the method is limited to an insert of dissimilar material to lap joints which requires axial movement of the pipe sections to make the joint, it is not practical for use in pipe repair as described above. Furthermore, the method itself contemplates that the temperature will not reach the fusion temperature of the sleeves, thus having the disadvantage that material of the flange thereof will not be available to fill any spacing that may exist at any location around the circumference of the pipe ends.

Other efforts for a satisfactory joint include the construction of a piston style dynamic coupling as shown in U.S. Pat. No. 4,386,796 assigned to the assignee of this application. That coupling, which satisfactory for its intended purpose, is relatively expensive to manufacture and is not satisfactory for all applications.

SUMMARY OF THE INVENTION

According to the present invention, a fusion welded butt joint is provided without the attendant prior art problem of poor structural integrity of the pipe end portions.

A pair of tubular insert sleeves made of the same thermoplastic material as the pipe sections incorporates barrels which are telescoped into the proximate ends of the pair of pipe sections to be joined, each sleeve being characterized by a radially outwardly disposed end flange for overlying the pipe end and having oppositely directed first and second faces. The first faces of the pair of sleeves engages upon the ends of the pipe sections, respectively, and the second faces are engaged with each other to form the butt joint.

A tubular coupling collar of thermoplastic material, previously telescoped onto one of the pipe sections, is axially slid along the exterior of the pipe section into coaxial overlying relation with the butt joint formed by the abutting second faces.

The coupling collar carries a heater in the form of a helical resistance coil or the like whereby energization of the coil heats the interface between the coupling sleeve and pipe sections to a molten state to establish the desired fusion weld. The flange of the insert sleeves ar sacrificed as filler material between the pipe ends and the barrels internally support the pipe section end portions against radially inward sagging or deformation during fusion welding, thereby preserving the structural integrity of the butt joint and inhibiting migration of any of the coils or turns of the helical heating element from their original spaced locations to closer spaced locations in the butt joint area.

The elevated temperature established by the heating means fuses the end flanges of the insert sleeves to one another and to the ends of the pipe sections to provide a fluid tight joint. The molten material of the insert sleeve flanges also flows into any voids or gaps and tends to compensate for any slight dimensional discrepancies which may exist in the pipe section ends.

Other objects and features of the invention will become apparent from consideration of the following description taken in connection with the accompanying drawings.

DESCRIPTION OF THE PREFERRED EMBODIMENT

Figure 1:
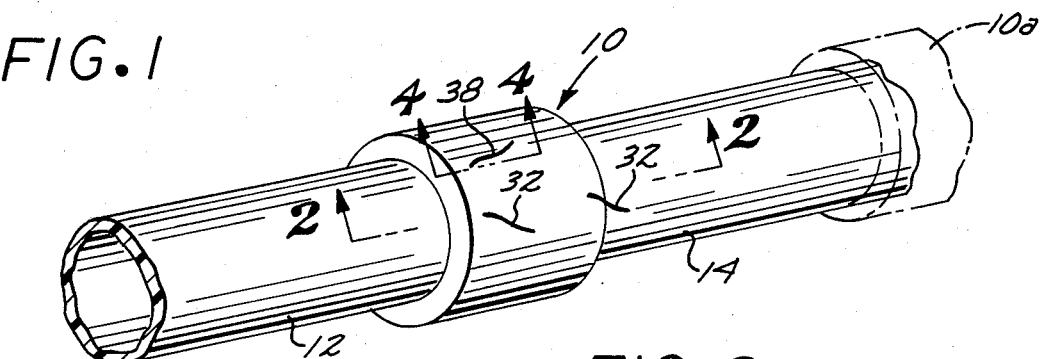
FIG. 1 is a perspective view of a pair of pipe sections coupled together by apparatus according to the present invention.

Referring now to the drawings, an apparatus 10 is illustrated for forming a fusion welded butt joint between a pair of thermoplastic pipe sections 12 and 14 which may be constructed of medium density polyethylene.

Figure 2:
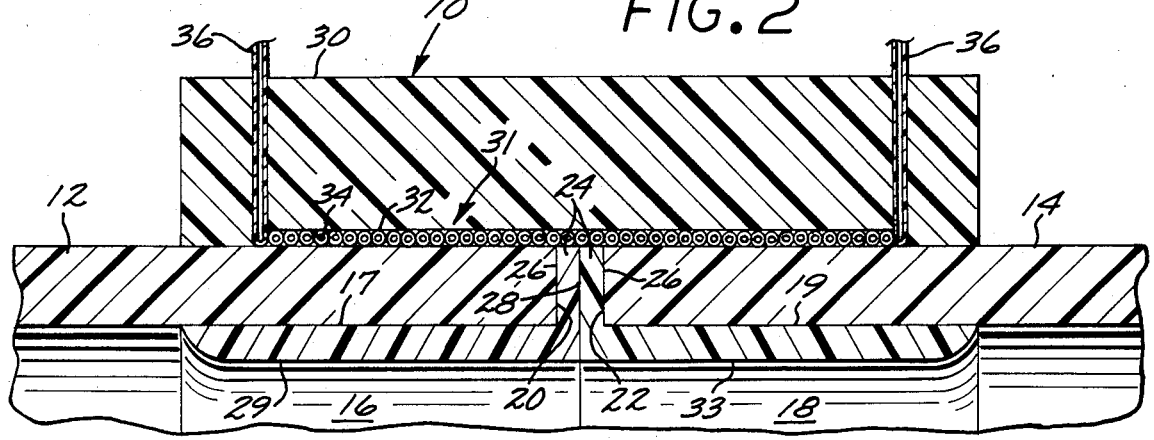
FIG. 2 is an enlarged view taken along the line 2—2 of FIG. 1, illustrating the pipe sections and apparatus components prior to fusion welding.

The apparatus 10 comprises, generally, a pair of tubular insert sleeves 16 and 18, as best seen in FIG. 2, which are also made of thermoplastic material such as medium density polyethylene which melts and fuses at the same temperature as the pipe sections 12 and 14. The sleeves are formed with barrels 17 and 19 dimensioned to telescope or fit closely within the ends 20 and 22 of the pipe sections 12 and 14, respectively, with their exterior surfaces in close, sliding engagement with the interior surfaces of the pipe sections.

Each of the sleeves 16 and 18 also includes a circumferential, radially outwardly disposed end flange 24 having oppositely directed first and second faces 26 and 28. The barrels 17 and 19 of the sleeves 16 and 18 are inserted into the pipe sections a sufficient distance to bring the first faces 26 into abutment with the pipe ends 20 and 22. As will be seen, when making a fusion butt joint the pipe sections are axially aligned with the second faces 28 in butting engagement with each other.

The apparatus 10 also includes a tubular coupling collar or sleeve 30 made of medium density polyethtylene. Imbedded in the interior surface of the coupling collar 30 is a heater, generally designed 31, preferably in the form of a heating coil received in an annular collar enlarged in diameter or recess 34 formed in its interior wall. The heater 31 takes the form of a helical heating coil or element 32 made up of a plurality of adjacent loops or turns of electrical resistance wire jacket with a suitable electrically insulating fusable plastic. The heating coil 32 terminates on its opposite extremity in a pair of leads 36 extending radially outwardly through the wall of the coupling sleeve 30 for connection to a source of electrical power (not shown). The collar is shown as being projecting on its opposite ends to the plane of the distal ends of the sleeves 16 and 18 but in practice is sometimes longer to project beyond that plane.

Figure 3:
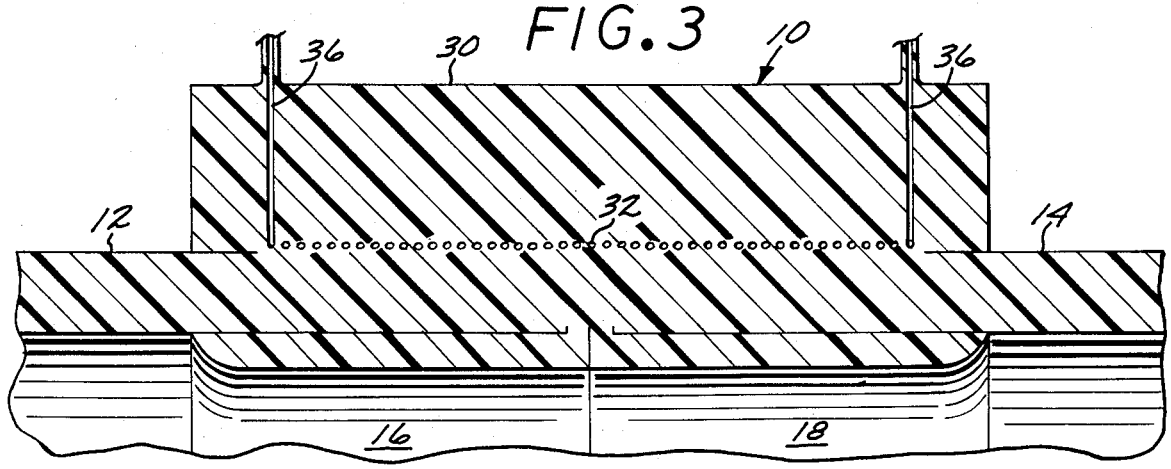
FIG. 3 is a view similar to FIG. 2, but illustrating the pipe sections and apparatus components subsequent to fusion welding.

Application of electrical power to the heating element 32 raises the temperature of the jacket thereof and adjacent thermoplastic material to their melting point to partially melt, fuse or render unitary the adjacent surface of the coupling sleeve 30, the pipe sections 12 and 14, and the end flanges 24 of the insert sleeves 16 and 18, as best seen in FIG. 3.

The abutting end flange second faces 28 become fused together, and the first faces 26 of the end flanges are fused to the adjacent pipe ends 20 and 22. It will be appreciated that the flanges 24 serve, not only to afford structural rigidity for the barrels 17 and 19 but act as sacrificial fusion material for filling any gaps resulting from misalignment or uneven cutting of the pipe section ends to thus tend to maintain uniform pipe wall thickness across the length of the joint formed by the pipe ends and flanges 24.

The cylindrical external surfaces of the insert barrels 17 and 19, being in intimate engagement with the adjacent surfaces of the pipe section end portions, support such end portions against thermal sagging and deformation at the temperatures developed during fusion welding of the joint. Thus, as the plastic jacketing on the electrical conductor in the loops 32 of the heater coil 31 melts to leave the configuration of FIG. 3, the uniform cylindrical configuration thereof is maintained to thus support each loop of conductor in its original spaced relationship to thus induce uniform heating throughout the length of the coil 31.

It will be appreciated that, since the source of heat from the coil 31 is exterior of the pipes 12 and 14, the walls of the pipes themselves will cooperate with the interface 29 and 33, between the interior of such pipe walls and exterior of the respective sleeves 16 and 18 to present a thermal barrier to transfer of heat from the heater 31 into the barrels 17 and 19 to thereby cause such barrels to remain at a reduced temperature during fusion to provide structural support to the pipe heated sections 12 and 14.

The present method of forming fusion welded butt joint comprises the step of locating the coupling sleeve 30 about the end portions of one of the pipe sections 12 and 14, followed or preceded by the step of locating the insert sleeves 16 and 18 within the pipe sections 12 and 14 to be joined.

The second faces 28 of the insert end flanges 24 are next abutted, and the coupling sleeve 30 is then slid into overlying relation to the butt joined formed by the end flanges 24. This is followed by development of sufficient heat through energization of the heating element 32 to fusion weld the interfaces between the coupling sleeve 30, the end flanges 24, and the pipe sections 12 and 14.

A related method according to the present invention is directed to the use of a pair of coupling sleeves to effect repair of a damaged pipe section by replacing it with a replacement pipe section. The second coupling sleeve and the associated insert sleeves are indicated schematically at 10a in FIG. 1.

Upon detection of a leak from an underground plastic pipe, a trench is excavated for about five feet, for example, to expose the damaged pipe. The pipe is squeezed off on opposite sides of the damaged area to seal against gas leakage. A length of pipe encompassing the damage is then removed and a new thermoplastic pipe 14 cut to a length which will fit into the gap left by the removed pipe and accommodate the thickness of four flanges 24 for a purpose which will be made apparent hereafter. It will be appreciated that the ends of the new pipe 14 cannot be fused directly to the ends of the remained pipe section by a heating tool since there is no room to shift the new pipe length 14 axially between the newly severed ends of the underground pipe to provide a sufficient to fit a heating tool between the pipe ends.

The replacement pipe 14 section is then fitted at its opposite ends with insert sleeves 16 or 18 and the coupling collars slidably telescoped over its opposite ends in retracted or inwardly disposed positions relative to the end faces thereof.

The barrels 17 and 19 of the insert sleeves 16 or 18 are also telescoped into the open ends of the adjacent original pipe sections. The pipe replacement section 14 is then axially aligned with the original pipe sections, with the faces of the insert flanges of the replacement section closely fitted against the insert flanges of the original pipe section. The two coupling collars are next telescoped over the resulting butt joints. It will be understood that during the fusion step when the end portions of the pipe sections 12 and 14 are heated, there will be some thermal growth which will cause the ends of such pipe sections to be driven toward one another to thus compress the flanges 24 toward one another. Fusion will then take place as described hereinabove. This provides fusion welded butt joints at both ends of the replacement pipe section, eliminating any need for special fittings such as union couplings or the like common in the plumbing art.

Figure 4:
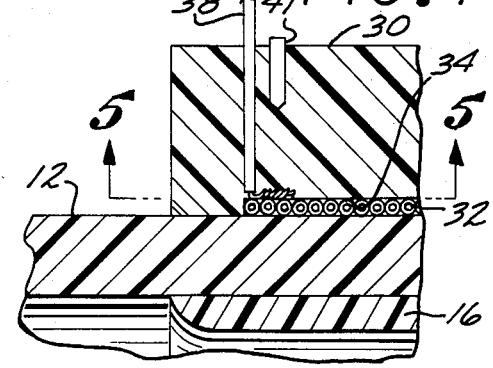
FIG. 4 is a partial section on an enlarged scale taken along the line 4—4 of FIG. 1.
Figure 5:
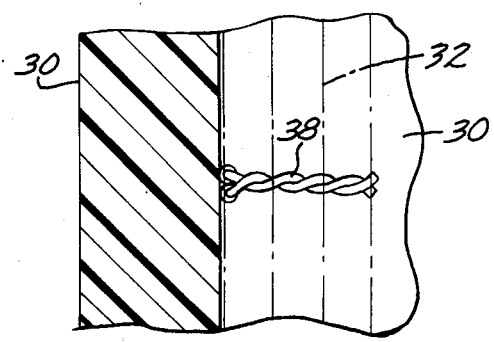
FIG. 5 is a view taken along the line 5—5 of FIG. 4.

Attainment of the proper fusion temperature is facilitated by employment of a thermocouple 38, as seen in FIGS. 4 and 5. The thermocouple 38 is embedded in a radial opening in the coupling sleeve 30 and the end having the joined conductors or lead is arranged in thermal contiguity with the heating element 32. At its opposite end the pair of separated leads is coupled to a suitable temperature measurement or control device (not shown) of any suitable type known in the prior art for displaying temperature readings, corresponding to the temperatures existing at the joint interfaces or for controlling the fusion temperature. In the preferred embodiment of a bore is formed in the collar 30 in closed spaced relationship with and parallel to the opening for the thermocouple 38 for receipt of an oversized pointed wedge 41. The wedge 41 when driven into position displaces some of the adjacent material forcing the collar 30 to thus press against the thermocouple 38 and wedge it securely in place.

Various modifications and changes may be made with regard to the foregoing detailed description without departing from the spirit of the invention.

I claim:

1. Pipe joint apparatus for forming a fusion joint between the ends of thermoplastic pipe sections of predetermined interior and exterior diameters and having a predetermined melting temperature, said apparatus comprising:

a pair of tubular plastic insert sleeves made of a thermoplastic meltable at said predetermined temperature and formed with barrels to telescope in close fitting relationship within the respective pipe sections, said sleeves including radialy outwardly disposed end flanges for overlying the ends of said pipe sections and having oppositely directed first and second faces for engagement of said first faces with the ends of the pipe sections, respectively, and for abutting engagement of said second faces with each other upon arrangement of the pipe sections in axially aligned relation; and a thermoplastic tubular coupling collar having mounted in the interior surface thereof a heater for heating said ends of said pipe sections and said flanges to said predetermined temperature, said collar being adapted to telescope over the exterior of the pipe sections for disposition of said heater in coaxial relation over the abutting said second faces whereby said heating means may be energized to heat said flanges and said ends of said pipe sections to said predetermined temperature to cause flanges and pipe ends to fuse together while the barrels of said coupling sleeves remain at a temperature below said predetermined temperature and afford radial support against radial inward displacement of the wall of said pipe sections.

2. Pipe joint apparatus for forming a fusion joint according to claim 1 wherein:

said flanges project radially a distance equal to the wall thickness of said pipe section.

3. A fusion welded butt joint comprising:

a pair of thermoplastic pipe sections meltable at a predetermined temperature and having end portions, respectively, arranged in axially aligned relation;

a pair of tubular thermoplastic insert sleeves meltable at said predetermined temperature and formed with respective barrels fitted closely within the ends of said pair of pipe sections, said sleeves including radially outwardly disposed end flanges having oppositely directed first and second faces, said first faces being fusion welded to the ends of the pipe sections, respectively, and said second faces being fusion welded to each other; and a tubular coupling collar made of thermoplastic material having an interior surface fusion welded to the exterior surfaces of said end portions, and located in overlying fusion welded relation to said end flanges.

4. A method of forming a fusion welded joint between the ends of a pair of thermoplastic pipe sections meltable at a predetermined temperature, said method comprising the steps of:

telescoping a thermoplastic tubular coupling collar over an end portion of one of said pipe sections;

selecting a pair of thermoplastic tubular insert sleeves which each include a barrel terminating in one end in a radially outwardly disposed end flange meltable at said predetermined temperature and having oppositely directed first and second faces;
inserting the barrels of said support sleeves into the ends of said pipe sections;
positioning said end flanges in abutting relation with said first faces engaged upon the ends of said pipe sections, respectively, and said second faces engaged upon each other;
telescoping said coupling collar into coaxial relation on said end flanges; and
developing heat to raise the temperature at the interfaces between said coupling sleeve, said flanges and said end portion to said predetermined temperature to fusion weld said interfaces and form said fusion welded butt joint.

5. A method of repairing damaged area in a subterranean thermoplastic pipe meltable at a predetermined temperature and comprising the steps of:
excavating said damaged pipe in said damaged area;
severing a selected length of pipe spanning said damaged area from said subterranean pipe to leave a gap between the remaining pipe sections of a predetermined length;
selecting a pair of tubular coupling collars of the type which include heating means and which will telescope over said pipe;
telescoping said collars over the respective ends of said pipe sections;
selecting four thermoplastic tubular insert sleeves, each of the type including a barrel terminating in one end in a radially outwardly disposed end flange of a predetermined thickness, meltable at a predetermined temperature, and having oppositely directed first and second faces;
selecting a repair pipe having a length substantially equal to said predetermined length, less four times said predetermined thickness;
inserting said barrels of said insert sleeves into the respective ends of said subterranean pipe and said repair pipe to form a repair assembly;
inserting said repair assembly in said gap with the end flanges in abutting relation with said first faces engaged upon the ends of said original and replacement pipe sections, respectively, and the adjacent said second faces engaged against each other;
sliding said pair of coupling collars into overlying relation over said end flanges adjacent the end portions of said replacement pipe section, respectively; and
applying energy to said heating means for a sufficient time to heat the interfaces between said coupling collars and said flanges and said end portions to said predetermined temperature to fusion weld said interfaces and form said fusion welded butt joints; and
disconnecting said energy prior to the time the temperature of said barrels reach said predetermined temperature.

* * * * *